United States Patent
Mine et al.

(10) Patent No.: US 9,455,442 B2
(45) Date of Patent: Sep. 27, 2016

(54) CARBON-COATED ACTIVE MATERIAL COMPOSITE AND LITHIUM ION BATTERY

(71) Applicant: SUMITOMO OSAKA CEMENT CO., LTD., Chiyoda-ku, Tokyo (JP)

(72) Inventors: Hiroyuki Mine, Tokyo (JP); Takao Kitagawa, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/430,408

(22) PCT Filed: May 15, 2014

(86) PCT No.: PCT/JP2014/062964
§ 371 (c)(1),
(2) Date: Mar. 23, 2015

(87) PCT Pub. No.: WO2014/185494
PCT Pub. Date: Nov. 20, 2014

(65) Prior Publication Data
US 2015/0255787 A1    Sep. 10, 2015

(30) Foreign Application Priority Data

May 16, 2013    (JP) .................................. 2013-104393

(51) Int. Cl.
*H01M 2/00* (2006.01)
*H01M 4/36* (2006.01)
(Continued)

(52) U.S. Cl.
CPC ............. *H01M 4/366* (2013.01); *H01M 4/133* (2013.01); *H01M 4/587* (2013.01); *H01M 4/625* (2013.01);
(Continued)

(58) Field of Classification Search
CPC ................... H01M 2/0202; H01M 2004/028; H01M 10/0569; H01M 2300/0037; H01M 4/133; H01M 4/366
See application file for complete search history.

(56) References Cited

U.S. PATENT DOCUMENTS

| | | |
|---|---|---|
| 2007/0141470 A1 | 6/2007 | Nakura |
| 2012/0129052 A1 | 5/2012 | Bauer et al. |

(Continued)

FOREIGN PATENT DOCUMENTS

| | | |
|---|---|---|
| CA | 2831877 | 10/2012 |
| EP | 2 696 411 A1 | 2/2014 |

(Continued)

OTHER PUBLICATIONS

International Search Report for PCT/JP2014/062964 mailed Jul. 15, 2014.

(Continued)

*Primary Examiner* — Mark F Huff
*Assistant Examiner* — Monique Wills
(74) *Attorney, Agent, or Firm* — Merchant & Gould P.C.

(57) ABSTRACT

A carbon-coated active material composite, an electrode and a lithium ion battery capable of improving electron conductivity and lithium ion conductivity when an electrode active material having a carbonaceous film formed on the surface is used as an electrode material are provided. In the carbon-coated active material composite, charge migration of lithium ions occurs at an interface between a carbonaceous film and an electrode active material, an activation energy of an insertion and removal reaction of lithium ions at an interface between the carbon-coated active material composite and an electrolytic solution is 45 kJ/mol to 85 kJ/mol, a value of a carbon supported amount to a specific surface area of particles of an electrode active material is 0.01 to 0.5, and the activation energy is measured using an electrolyte solution obtained by mixing ethylene carbonate and diethyl carbonate at a 1:1 ratio.

8 Claims, 1 Drawing Sheet

(51) Int. Cl.
    *H01M 4/133*       (2010.01)
    *H01M 4/587*       (2010.01)
    *H01M 10/0525*     (2010.01)
    *H01M 10/0569*     (2010.01)
    *H01M 4/62*        (2006.01)
    *H01M 4/02*        (2006.01)
    *H01M 4/58*        (2010.01)

(52) U.S. Cl.
    CPC ..... *H01M 10/0525* (2013.01); *H01M 10/0569* (2013.01); *H01M 4/5825* (2013.01); *H01M 2004/021* (2013.01); *H01M 2004/028* (2013.01); *H01M 2300/0037* (2013.01); *Y02E 60/122* (2013.01); *Y02T 10/7011* (2013.01)

(56) References Cited

U.S. PATENT DOCUMENTS

| | | | |
|---|---|---|---|
| 2012/0301780 A1 | 11/2012 | Kitagawa | |
| 2013/0122359 A1* | 5/2013 | Sato | H01M 4/13 429/188 |
| 2014/0113191 A1 | 4/2014 | Nakamura | |

FOREIGN PATENT DOCUMENTS

| | | |
|---|---|---|
| JP | A-2001-015111 | 1/2001 |
| JP | A-2007-188878 | 7/2007 |
| JP | A-2009-272041 | 11/2009 |
| JP | A-2012-216473 | 11/2012 |
| JP | A-2012-248378 | 12/2012 |
| WO | WO 2012/133566 A1 | 10/2012 |

OTHER PUBLICATIONS

International Written Opinion for PCT/JP2014/062964 mailed Jul. 15, 2014.
European Search Report for EP Patent Application No. 14798605.3 (mailed Jun. 30, 2016).
European Office Action for EP Patent Application No. 14798605.3 (mailed Aug. 10, 2016).
Kim et al., "A modified mechanical activation synthesis for carbon-coated LiFePO$_4$ cathode in Lithium batteries", *Materials Letters*, 61(18):3822-3825 (2006).
Wang et al., "Understanding and recent development of carbon coating on LiFePO$_4$ cathode materials for lithium-ion batteries", *Energy & Environment Science*, 5(1): 5163-5185 (2011).

* cited by examiner

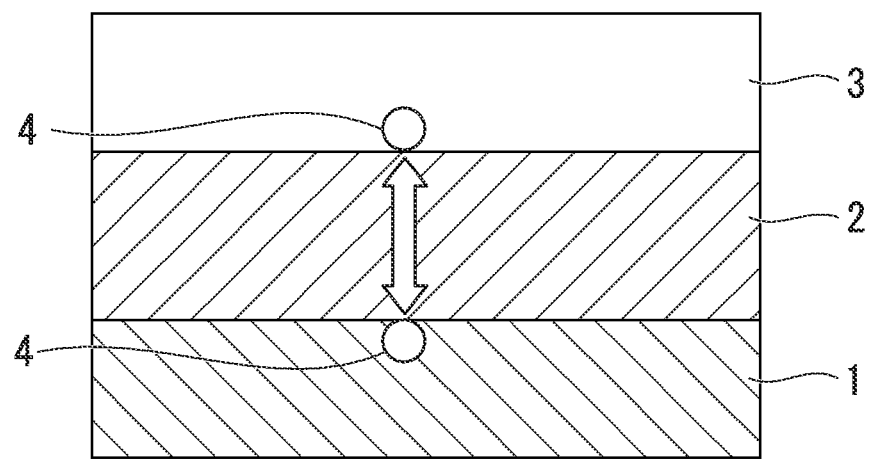

CARBON-COATED ACTIVE MATERIAL COMPOSITE AND LITHIUM ION BATTERY

This application is a U.S. National Stage Application under 35 U.S.C. §371 of International Patent Application No. PCT/JP2014/062964 filed 15 May 2014, which claims the benefit of priority to Japanese Patent Application No. 2013-104393 filed 16 May 2013, the disclosures of all of which are hereby incorporated by reference in their entireties. The International Application was published in Japanese on 20 Nov. 2014 as WO 2014/185494.

BACKGROUND OF THE INVENTION

1. Technical Field

The present invention relates to a carbon-coated active material composite, an electrode, and a lithium ion battery, and particularly to a carbon-coated active material composite that is a cathode material for batteries, furthermore, a carbon-coated active material composite preferably available as a cathode material for lithium ion batteries, and a lithium ion battery including a cathode which includes the carbon-coated active material composite.

2. Background

In recent years, as a battery anticipated to have small size, light weight, and high capacity, a non-aqueous electrolytic solution-based secondary battery such as a lithium ion battery has been proposed and put into practical use.

The lithium ion battery is constituted of a cathode and an anode which allow the reversible insertion and removal of lithium ions, and a non-aqueous electrolyte.

Regarding an anode material for lithium ion batteries, as an anode active material, generally, a lithium-containing metal oxide allowing the reversible insertion and removal of lithium ions such as a carbon-based material or lithium titanate ($Li_4Ti_5O_{12}$) is used.

On the other hand, regarding a cathode material for lithium ion batteries, as a cathode active material, generally, a lithium-containing metal oxide allowing the reversible insertion and removal of lithium ions such as lithium iron phosphate ($LiFePO_4$) or an electrode material mixture including a binder and the like is used. In addition, the cathode in the lithium ion battery is formed by applying the electrode material mixture to the surface of a metal foil called a current collector.

Compared with secondary batteries of the related art such as lead batteries, nickel-cadmium batteries, and nickel-hydrogen batteries, lithium ion batteries have a lighter weight, a smaller size, and higher energy, and thus are used not only as small-size power supplies in portable electronic devices such as mobile phones and notebook personal computers but also as large-size stationary emergency power supplies.

In addition, recently, studies have been underway regarding the use of lithium ion batteries as high-output power supplies for plug-in hybrid vehicles, hybrid vehicles, and electric power tools, and batteries used as the high-output power supplies are required to have high-speed charge and discharge characteristics.

However, electrode active materials, for example, electrode materials including a lithium phosphate compound allowing the reversible insertion and removal of lithium ions have a problem of low electron conductivity. Therefore, to increase the electron conductivity of electrode materials, there has been proposed an electrode material in which the particle surfaces of an electrode active material are covered with an organic compound that is a carbon source, and then the organic compound is carbonized, whereby a carbonaceous film is formed on the surface of the electrode active material, and carbon in the carbonaceous film is interposed as an electron conductive substance (For example, Japanese Laid-open Patent Publication No. 2001-15111).

PRIOR ART DOCUMENTS

Patent Documents

Patent Document 1: Japanese Unexamined Patent Application, First Publication No. 2001-15111

DISCLOSURE OF THE INVENTION

Problems to be Solved by the Invention

Meanwhile, in order to use the electrode active material including a lithium phosphate compound as an electrode material for lithium ion batteries that are used as high-output power supplies, it is necessary to increase electrode conductivity by forming a carbonaceous film on the surface of the electrode active material.

However, due to the presence of the carbonaceous film, on the surface of the lithium phosphate compound, the insertion and removal of lithium ions occurs at the interface with the carbonaceous film, but there is a problem of a slow speed of the insertion and removal reaction.

When the area of the surface of the lithium phosphate compound covered with the carbonaceous film to improve the electron conductivity as described above is increased, the insertion and removal speed of lithium ions becomes slow, and therefore, even in a case in which the electron conductivity is improved, the sum of the battery internal resistance increases, and particularly, the voltage significantly drops when high-speed charge and discharge is carried out.

When the area of the surface of the lithium phosphate compound covered with the carbonaceous film is decreased in order to increase the insertion and removal speed of lithium ions on the surface of the lithium phosphate compound, the electron conductivity on the surface of the lithium phosphate compound becomes insufficient, and thus, even in a case in which the insertion and removal speed of lithium ions is improved, the sum of the battery internal resistance increases, and particularly, the voltage significantly drops when high-speed charge and discharge is carried out.

When a large amount of an organic compound that is a carbon source for forming the carbonaceous film is added to improve the electron conductivity, the film thickness of the carbonaceous film is increased. Since lithium ions have a slow migration speed in the carbonaceous film, even in a case in which the electron conductivity is improved, the sum of the battery internal resistance increases, and particularly, the voltage significantly drops when high-speed charge and discharge is carried out.

Thus far, a variety of studies have been conducted seeking to increase the output of lithium ion batteries, and, for example, there has been proposed an electrode material in which the primary particle diameters of the particles of an electrode active material are reduced, thereby reducing the migration distance of lithium ions in the electrode active material; however, in this material, the specific surface area increases, and the mass of the carbonaceous film in the electrode increases, and thus the electrode capacity decreases.

The present invention has been made to solve the above-described problems, and an purpose of some aspects of the present invention is to provide a carbon-coated active material composite and a lithium ion battery which are capable of improving not only electron conductivity but also lithium ion conductivity in a case in which an electrode active material having a carbonaceous film formed on the surface is used as an electrode material.

Means for Solving the Problems

The present inventors found that, when the activation energy of the insertion and removal reaction of lithium ions occurring at the interface between a carbon-coated active material composite and an electrolytic solution is in a range of 45 kJ/mol to 85 kJ/mol, and the value of the carbon supported amount with respect to the specific surface area of the particles of an electrode active material ([carbon supported amount]/[specific surface area of the particles of an electrode active material]) is set in a range of 0.01 to 0.5, it is possible to realize an electrode active material which has electron conductivity and lithium ion conductivity satisfying high-speed charge and discharge characteristics, and is coated with the carbonaceous coat, and completed the present invention.

That is, a carbon-coated active material composite of the present invention is

[1] a carbon-coated active material composite in which charge migration of lithium ions occurs at an interface between a carbonaceous film and an electrode active material, in which an activation energy of an insertion and removal reaction of lithium ions occurring at an interface between the carbon-coated active material composite and an electrolytic solution is in a range of 45 kJ/mol to 85 kJ/mol, a value of a carbon supported amount with respect to a specific surface area of particles of an electrode active material ([carbon supported amount]/[specific surface area of the particles of the electrode active material]) is in a range of 0.01 to 0.5, and the activation energy is a value measured using an electrolyte solution obtained by mixing ethylene carbonate and diethyl carbonate at a 1:1 ratio.

The activation energy of the insertion and removal reaction of lithium ions occurring at the interface between the carbon-coated active material composite and the electrolytic solution can be set in a range of 45 kJ/mol to 85 kJ/mol by, for example, using an electrode active material in which the value of the carbon supported amount with respect to the specific surface area of the particles of the electrode active material ([carbon supported amount]/[specific surface area of the particles of the electrode active material]) is in a range of 0.01 to 0.5, the density of the carbonaceous film is in a range of 0.1 g/cm$^3$ to 1.5 g/cm$^3$, the film thickness of the carbonaceous film is in a range of 0.1 nm to 10 nm, and 70% or more of the surfaces of the particles of the electrode active material are coated with a net-shaped carbonaceous film.

In addition, the present inventors found that, when an increase in the activation energy of the insertion and removal reaction of lithium ions occurring at the interface between the carbonaceous coat and the electrode active material remains in a range of 5 kJ/mol to 40 kJ/mol compared with the activation energy of the insertion and removal reaction of lithium ions occurring at the interface between the electrode active material that is yet to be coated with carbon and the electrolytic solution, and the value of the carbon supported amount with respect to the specific surface area of the particles of the electrode active material ([carbon supported amount]/[specific surface area of the particles of the electrode active material]) is set in a range of 0.01 to 0.5, it is possible to realize an electrode active material which has electron conductivity and lithium ion conductivity satisfying high-speed charge and discharge characteristics, and is coated with the carbonaceous coat, and completed the present invention.

That is, the carbon-coated active material composite of the present invention is

[2] a carbon-coated active material composite in which charge migration of lithium ions occurs at an interface between a carbonaceous film and an electrode active material, in which an activation energy of an insertion and removal reaction of lithium ions occurring at an interface between the carbon-coated active material composite and an electrolytic solution increases by a range of 5 kJ/mol to 40 kJ/mol compared with the activation energy of the insertion and removal reaction of lithium ions occurring at an interface between the electrode active material that is yet to be coated with carbon and the electrolytic solution, a value of a carbon supported amount with respect to a specific surface area of particles of the electrode active material ([carbon supported amount]/[specific surface area of the particles of the electrode active material]) is in a range of 0.01 to 0.5, and the activation energy is a value measured using an electrolyte solution obtained by mixing ethylene carbonate and diethyl carbonate at a 1:1 ratio.

The increase in the activation energy of the insertion and removal reaction of lithium ions occurring at the interface between the carbonaceous coat and the electrode active material can remains in a range of 5 kJ/mol to 40 kJ/mol compared with the activation energy of the insertion and removal reaction of lithium ions occurring at the interface between the electrode active material that is yet to be coated with carbon and the electrolytic solution by using an electrode active material in which the value of the carbon supported amount with respect to the specific surface area of the particles of the electrode active material ([carbon supported amount]/[specific surface area of the particles of the electrode active material]) is in a range of 0.01 to 0.5, the density of the carbonaceous film is in a range of 0.1 g/cm$^3$ to 1.5 g/cm$^3$, the film thickness of the carbonaceous film is in a range of 0.1 nm to 10 nm, and 70% or more of the surfaces of the particles of the electrode active material are coated with a net-shaped carbonaceous film.

[3] The carbon-coated active material composite of the present invention is the carbon-coated active material composite according to [1] or [2], in which the carbonaceous film has a net-shaped structure, coats 70% or more of surfaces of the particles of the electrode active material, and a density of the carbonaceous film is in a range of 0.1 g/cm$^3$ to 1.5 g/cm$^3$.

[4] The carbon-coated active material composite of the present invention is the carbon-coated active material composite according to [1], [2], or [3], in which a film thickness of the carbonaceous film is in a range of 0.1 nm to 10 nm.

[5] A lithium ion battery of the present invention is a lithium ion battery including a cathode which includes the carbon-coated active material composite according to any one of [1] to [4].

In the present invention, the insertion and removal reaction speeds of lithium ions in the electrode active material are compared by assessing the activation energy. The activation energy of the reaction is given by Formula (1) described below.

$$k = k_0 \times \exp(-G^*/RT) \quad (1)$$

(k: reaction speed, $k_0$: reaction speed in the standard state, $G^*$: activation energy, T: temperature, R: gas constant)

As is clear from Formula (1) described above, in a case in which the temperature is constant, the insertion and removal reaction speeds of lithium ions in the electrode active material can be compared by obtaining the activation energy.

It is known that the activation energy for the migration of lithium ions, which occurs at the interface between the electrolytic solution and the electrode active material, is very dependent on the type of a solvent in the electrolytic solution. This activation energy refers to the activation energy of a speed-determining reaction among elementary reactions necessary when lithium ions migrate between the electrolytic solution and the electrode active material.

That is, as illustrated in FIG. 1, the activation energy is an energy necessary when lithium ions 4 migrate between an electrolytic solution 1 and an electrode active material 3. In FIG. 1, reference sign 2 indicates a carbonaceous film formed on the surface of the electrode active material.

The activation energy for the migration of lithium ions occurring at the interface between the electrolytic solution and the electrode active material is dependent on the type of the solvent for the following reason.

In the electrolytic solution, since lithium ions are strong Lewis acids, and thus have a strong interaction with solvent molecules, the lithium ions stay in a solvated state in which the lithium ions strongly attract solvent molecules. Since a process for detaching the solvated solvent molecules from the lithium ions serves as a speed-determining process, the activation energy of the migration reaction of lithium ions occurring at the interface between the electrolytic solution and the active material is dependent on the type of the solvent.

In addition, the values of the activation energy do not differ significantly between different types of the electrode active materials.

According to the carbon-coated active material composite of the present invention, since the value of the carbon supported amount with respect to the specific surface area of the particles of the electrode active material ([carbon supported amount]/[specific surface area of the particles of the electrode active material]) is in a range of 0.01 to 0.5, it is possible to set the activation energy of the insertion and removal reaction of lithium ions occurring in the carbon-coated active material composite in a range of 45 kJ/mol to 85 kJ/mol, and it is possible to provide an electrode active material coated with a carbonaceous film which has electron conductivity and lithium ion conductivity satisfying high-speed charge and discharge characteristics.

According to the carbon-coated active material composite of the present invention, since the value of the carbon supported amount with respect to the specific surface area of the particles of the electrode active material ([carbon supported amount]/[specific surface area of the particles of the electrode active material]) is in a range of 0.01 to 0.5, it is possible to make the increase in the activation energy of the insertion and removal reaction of lithium ions occurring at the interface between the carbonaceous coat and the electrode active material remain in a range of 5 kJ/mol to 40 kJ/mol compared with the activation energy of the insertion and removal reaction of lithium ions occurring at the interface between the electrode active material that is yet to be coated with carbon and the electrolytic solution, and it is possible to provide an electrode active material coated with a carbonaceous film which has electron conductivity and lithium ion conductivity satisfying high-speed charge and discharge characteristics.

According to the lithium ion battery of the present invention, since the cathode which includes the carbon-coated active material composite is included, it is possible to suppress the internal resistance of the battery at a low level, and consequently, it is possible to carry out high-speed charge and discharge without the significant drop of the voltage.

Since it is possible to increase the speed of the charge and discharge characteristics without the addition of fibrous conductive carbon, unlike in the related art, and the addition of a lamellar oxide or a spinel-type cathode material having excellent high-speed charge and discharge characteristics, it is possible to apply the lithium ion battery to high-output power supplies requiring high-speed charge and discharge.

An electrode of the present invention may be constituted by including the carbon-coated active material composite of the present invention.

According to the electrode of the present invention, since the carbon-coated active material composite of the present invention is included, it is possible to provide an electrode having improved electron conductivity without impairing lithium ion conductivity.

The lithium ion battery of the present invention may be constituted by including a cathode made using the electrode of the present invention.

According to the lithium ion battery of the present invention, since the cathode made using the electrode of the present invention is included, it is possible to suppress the internal resistance of the battery at a low level, and consequently, it is possible to carry out high-speed charge and discharge without the significant drop of the voltage.

In addition, since it is possible to increase the speed of the charge and discharge characteristics without the addition of fibrous conductive carbon, unlike in the related art, and the addition of a lamellar oxide or a spinel-type cathode material having excellent high-speed charge and discharge characteristics, it is possible to apply the lithium ion battery to high-output power supplies requiring high-speed charge and discharge.

BRIEF DESCRIPTION OF THE DRAWING

FIG. 1 is a view describing the migration of lithium ions between an electrolytic solution and an electrode active material.

DETAILED DESCRIPTION OF THE INVENTION

Embodiments for carrying out the carbon-coated active material composite, the electrode, and the lithium ion battery of the present invention will be described.

The embodiments are specific descriptions for better understanding of the purpose of the present invention, and unless particularly otherwise described, the present invention is not limited thereto.

Carbon-Coated Active Material Composite

The carbon-coated active material composite of the present embodiment is particles of an electrode active material obtained by forming a carbonaceous film on the surface of the electrode active material, in which the charge migration of lithium ions occurs at the interface between the carbonaceous film and the electrode active material, the activation energy of the insertion and removal reaction of lithium ions occurring at the interface between the carbon-coated active material composite and an electrolytic solution is in a range of 45 kJ/mol to 85 kJ/mol, and the value of the carbon supported amount with respect to the specific surface area of the particles of the electrode active material ([carbon supported amount]/[specific surface area of the particles of the electrode active material]) is in a range of 0.01 to 0.5.

The reason for the activation energy of the insertion and removal reaction of lithium ions occurring at the interface between the carbon-coated active material composite and the electrolytic solution to be preferably in the above-described range is that, when the activation energy is less than 45 kJ/mol, there is a gap between the carbonaceous film and the surface of the electrode active material, or the area of the surface of the electrode active material that cannot be coated with the carbonaceous film increases, thus, the electron conductivity of the electrode active material becomes insufficient, and therefore the voltage significantly drops particularly when high-speed charge and discharge is carried out.

On the other hand, when the energy exceeds 85 kJ/mol, the reaction speed of lithium ions inserted into and removed from the electrode active material is too slow, and therefore the voltage significantly drops particularly when high-speed charge and discharge is carried out.

The carbon-coated active material composite of the present embodiment is particles of an electrode active material obtained by forming a carbonaceous film on the surface of the electrode active material, in which the charge migration of lithium ions occurs at the interface between the carbonaceous film and the electrode active material, the activation energy of the insertion and removal reaction of lithium ions occurring at the interface between the carbonaceous film and the electrode active material increases by a range of 5 kJ/mol to 40 kJ/mol compared with the activation energy of the insertion and removal reaction of lithium ions occurring at the interface between the electrode active material that is yet to be coated with carbon and the electrolytic solution, and the value of the carbon supported amount with respect to the specific surface area of the particles of the electrode active material ([carbon supported amount]/[specific surface area of the particles of the electrode active material]) is in a range of 0.01 to 0.5.

The activation energy of the insertion and removal reaction of lithium ions occurring at the interface between the carbonaceous film and the electrode active material preferably increases by a range of 5 kJ/mol to 40 kJ/mol compared with the activation energy of the insertion and removal reaction of lithium ions occurring at the interface between the electrode active material that is yet to be coated with carbon and the electrolytic solution.

The reason for the increase in the amount of the activation energy of the insertion and removal reaction of lithium ions occurring at the interface between the carbonaceous film and the electrode active material with respect to the activation energy of the insertion and removal reaction of lithium ions occurring at the interface between the electrode active material that is yet to be coated with carbon and the electrolytic solution to be preferably in the above-described range is that, when the increase in the amount of the activation energy of the insertion and removal reaction of lithium ions occurring at the interface between the carbonaceous film and the electrode active material with respect to the activation energy of the insertion and removal reaction of lithium ions occurring at the interface between the electrode active material that is yet to be coated with carbon and the electrolytic solution is less than 5 kJ/mol, there is a gap between the carbonaceous film and the surface of the electrode active material, or the area of the surface of the electrode active material that cannot be coated with the carbonaceous film increases, thus, the electron conductivity of the electrode active material becomes insufficient, and therefore the voltage significantly drops particularly when high-speed charge and discharge is carried out.

On the other hand, when the increase in the amount of the energy exceeds 40 kJ/mol, the reaction speed of lithium ions inserted into and removed from the electrode active material is too slow, and therefore the voltage significantly drops particularly when high-speed charge and discharge is carried out.

The carbon supported amount refers to the mass of the carbonaceous film in 100 g of the particles of the carbon-coated active material composite, and the unit thereof is grams (g). In addition, the unit of the specific surface area of the particles of the electrode active material is square meters per gram ($m^2/g$).

The value of [carbon supported amount]/[specific surface area of the particles of the electrode active material] in the carbon-coated active material composite is in a range of 0.01 to 0.5, and preferably in a range of 0.05 to 0.3.

The reason for setting the value of [carbon supported amount]/[specific surface area of the particles of the electrode active material] in the above-described range is that, when the value of [carbon supported amount]/[specific surface area of the particles of the electrode active material] is less than 0.01, the coating ratio of the carbonaceous film on the surfaces of the particles of the electrode active material becomes low, consequently, the carbon supported amount in the particles of the carbon-coated active material composite becomes small, and the electron conductivity on the surfaces of the particles of the electrode active material is insufficient, and therefore the voltage significantly drops particularly when high-speed charge and discharge is carried out.

On the other hand, when the value of [carbon supported amount]/[specific surface area of the particles of the electrode active material] exceeds 0.5, the film thickness of the carbonaceous film becomes thick, and the migration distance in the carbonaceous film, in which lithium ions migrate at a low speed, becomes long, and therefore the voltage significantly drops particularly when high-speed charge and discharge is carried out.

The density of the carbonaceous film is preferably in a range of 0.1 $g/cm^3$ to 1.5 $g/cm^3$, and more preferably in a range of 0.2 $g/cm^3$ to 1.3 $g/cm^3$.

The density of the carbonaceous film is the value of [the carbonaceous mass of the carbonaceous film]/[the volume of the carbonaceous film computed from the average film thickness of the carbonaceous film and the surface area of the electrode active material].

The reason for setting the density of the carbonaceous film in the above-described range is that, when the density of the carbonaceous film is less than 0.1 $g/cm^3$, the structure of the carbonaceous film becomes too loose, and it becomes impossible to sufficiently ensure the electron conductivity on the surfaces of the particles of the electrode active material, and therefore the voltage significantly drops particularly when high-speed charge and discharge is carried out.

On the other hand, when the density of the carbonaceous film exceeds 1.5 $g/cm^3$, the structure of the carbonaceous film becomes dense, and thus it becomes impossible for the electrolytic solution to enter into the carbonaceous film, and the migration distance in the carbonaceous film, in which lithium ions migrate at a low speed, becomes long, and therefore the voltage significantly drops particularly when high-speed charge and discharge is carried out.

The carbonaceous coat preferably coats 70% or more, more preferably coats 80% or more, and still more preferably coats 85% to 100% of the surfaces of the particles of the electrode active material.

The reason for setting the proportion (coating ratio) of the surfaces of the particles of the electrode active material coated with the carbonaceous film in the above-described range is that, when the coating ratio of the carbonaceous film is less than 70%, the electron conductivity on the surfaces of the particles of the electrode active material is insufficient, and therefore the voltage significantly drops particularly when high-speed charge and discharge is carried out.

The coating ratio of the carbonaceous film can be measured using a transmission electron microscope (TEM), an energy-dispersive X-ray spectroscope (EDX), or the like.

The carbonaceous film preferably has a net-shaped structure. The net portions in the net shape are made of a carbonaceous material, and portions other than the carbonaceous material (portions other than the net portions in the net shape) form spaces. Therefore, the electrolytic solution is capable of entering into the net-shaped carbonaceous film, and it is possible for carbon and the electrolytic solution to be unevenly present on the surfaces of the particles of the electrode active material. Therefore, it is possible for the electrolytic solution having a fast insertion and removal reaction speed of lithium ions and carbon imparting electron conduction to preferably be present on the surfaces of the particles of the electrode active material, and therefore it is possible to carry out high-speed charge and discharge.

The reason for giving a net-shaped structure to the carbonaceous film is that, for example, when the carbonaceous film has an island shape, the insertion and removal reaction speed of lithium ions becomes slow in portions coated with the carbonaceous film on the surfaces of the particles of the electrode active material, and on the other hand, in portions not coated with the carbonaceous film on the surfaces of the particles of the electrode active material, the electron conductivity is insufficient, and therefore the voltage significantly drops particularly when high-speed charge and discharge is carried out. In addition, in a case in which the structure of the carbonaceous film is too dense to allow the electrolytic solution to enter, the insertion and removal reaction of lithium ions on the surfaces of the particles of the electrode active material is limited only to the migration from the carbonaceous film having a slow reaction speed, and thus the insertion and removal reaction speed of lithium ions on the surfaces of the particles of the electrode active material becomes slow, and therefore the voltage significantly drops particularly when high-speed charge and discharge is carried out.

The film thickness of the carbonaceous film is preferably in a range of 0.1 nm to 10 nm, and more preferably in a range of 1 nm to 5 nm.

The reason for setting the film thickness of the carbonaceous film in the above-described range is that, when the film thickness of the carbonaceous film is less than 0.1 nm, it is difficult to produce a uniform carbonaceous film, it becomes impossible to uniformly coat the surfaces of the particles of the electrode active material with the carbonaceous film, and the electron conductivity on the surfaces of the particles of the electrode active material is insufficient, and therefore the voltage significantly drops particularly when high-speed charge and discharge is carried out.

On the other hand, when the film thickness of the carbonaceous film exceeds 10 nm, the migration distance in the carbonaceous film, in which lithium ions migrate at a low speed, becomes long, and therefore the voltage significantly drops particularly when high-speed charge and discharge is carried out.

As described above, even when [carbon supported amount]/[specific surface area of the particles of the electrode active material], the density of the carbonaceous film, the coating ratio of the carbonaceous film, and the film thickness of the carbonaceous film are regulated values, it is not possible to estimate the distribution state of the carbonaceous film and the contact state between the cathode material and the carbonaceous film, thus, there are cases in which battery characteristics could not be obtained in the related art; however, in the present embodiment, it becomes possible to manage the battery characteristics using the activation energy.

The electrode active material constituting the carbon-coated active material composite preferably includes, as a main component, one selected from a group consisting of lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

Here, A is preferably Co, Mn, Ni, or Fe, and D is preferably Mg, Ca, Sr, Ba, Ti, Zn, or Al in terms of a high discharge potential, an abundant resource amount, safety, and the like.

Here, the rare earth elements refer to the 15 elements of La, Ce, Pr, Nd, Pm, Sm, Eu, Gd, Tb, Dy, Ho, Er, Tm, Yb, and Lu which belong to the lanthanum series.

In the particles of the electrode active material, the specific surface area is preferably in a range of 1 $m^2/g$ to 80 $m^2/g$, and more preferably in a range of 4 $m^2/g$ to 50 $m^2/g$.

The reason for setting the specific surface area of the particles of the electrode active material in the above-described range is that, when the specific surface area of the particles of the electrode active material is less than 1 $m^2/g$, the migration of lithium ions or electrons in the electrode active material takes time, and thus the output characteristics deteriorate. On the other hand, when the specific surface area of the particles of the electrode active material exceeds 80 $m^2/g$, the increase in the specific surface area increases the necessary mass of the carbonaceous film, and thus the charge and discharge capacity is reduced.

In the present embodiment, the sum of, mainly, electron migration resistance and lithium ion migration resistance is referred to as the "internal resistance".

The electron migration resistance is proportional to the film thickness of the carbonaceous film, and the density and crystallinity of the carbonaceous film. Meanwhile, the lithium ion migration resistance is inversely proportional to the film thickness of the carbonaceous film and the density and crystallinity of the carbonaceous film.

As a method for assessing the internal resistance, for example, a current rest method or the like is used. In the current rest method, the internal resistance is measured as the sum of interconnection resistance, contact resistance, electron migration resistance, lithium ion migration resistance, lithium reaction resistances in the positive and anodes, interelectrode resistance determined by the distance between the positive and anodes, the resistance relating to the solvation and desolvation of the lithium ions, and the solid electrolyte interface (SEI) migration resistance of the lithium ions.

Method for Manufacturing the Carbon-Coated Active Material Composite

A method for manufacturing the carbon-coated active material composite of the present embodiment is a method including a step of drying a slurry, which includes an electrode active material or a precursor thereof, an organic compound, a pore-forming agent, and water, and has a ratio (D90/D10) of the particle diameter (D90) when the accumulated volume percentage is 90% in the particle size distribution of the electrode active material or the precursor thereof to the particle diameter (D10) when the accumulated volume percentage is 10% in a range of 5 to 30, and then firing the obtained dried substance at 500° C. to 1000° C. in a non-oxidative atmosphere, a method in which the carbonaceous film is formed using expanded graphite, acetylene black, ketjen black, graphene, or the like having a sufficiently smaller particle diameter than electrode active material particles, or a method in which the carbonaceous film is formed on the surface of the electrode active material using a carbon source and a method such as deposition, sputtering, or CVD.

Similar to the electrode active material constituting the carbon-coated active material composite, the electrode active material preferably includes, as a main component, one selected from a group consisting of lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z \leq 1.5$).

Here, A is preferably Co, Mn, Ni, or Fe, and D is preferably Mg, Ca, Sr, Ba, Ti, Zn, or Al in terms of a high discharge potential, an abundant resource amount, safety, and the like.

Here, the rare earth elements refer to the 15 elements of La, Ce, Pr, Nd, Pm, Sm, Eu, Gd, Tb, Dy, Ho, Er, Tm, Yb, and Lu which belong to the lanthanum series.

As the compound represented by $Li_xA_yD_zPO_4$ ($Li_xFe_yA_zBO_4$ powder), it is possible to use a compound manufactured using a method of the related art such as a solid phase method, a liquid phase method, or a gas phase method.

As the compound ($Li_xA_yD_zPO_4$ powder), a compound ($Li_xA_yD_zPO_4$ powder) obtained by, for example, hydrothermally synthesizing a slurry-form mixture obtained by mixing a Li source selected from a group consisting of lithium salts such as lithium acetate ($LiCH_3COO$) and lithium chloride (LiCl) and lithium hydroxide (LiOH), a divalent iron salt such as iron (II) chloride ($FeCl_2$), iron (II) acetate ($Fe(CH_3COO)_2$), or iron (II) sulfate ($FeSO_4$), a phosphoric acid compound such as phosphoric acid ($H_3PO_4$), ammonium dihydrogen phosphate ($NH_4H_2PO_4$), or diammonium hydrogen phosphate (($NH_4)_2HPO_4$), and water using a pressure-resistant airtight container, washing the obtained sediment using water so as to generate a cake-form precursor substance, and firing the cake-form precursor substance can be preferably used.

The $Li_xA_yD_zPO_4$ powder may be crystalline particles, amorphous particles, or mixed crystal particles in which crystalline particles and amorphous particles coexist. The $Li_xA_yD_zPO_4$ powder may be amorphous particles since, when thermally treated in a non-oxidative atmosphere at 500° C. to 1000° C., the amorphous $Li_xA_yD_zPO_4$ powder crystallizes.

The size of the electrode active material is not particularly limited, and the average particle diameter of the primary particles is preferably in a range of 0.01 μm to 20 μm, and more preferably in a range of 0.02 μm to 5 μm.

The reason for setting the average particle diameter of the primary particles of the electrode active material in the above-described range is that, when the average particle diameter of the primary particles is less than 0.01 μm, it becomes difficult to sufficiently cover the surfaces of the primary particles with a carbon thin film, the discharge capacity at a high-speed charge and discharge rate becomes low, and it becomes difficult to realize sufficient charge and discharge rate performance.

On the other hand, when the average particle diameter of the primary particles exceeds 20 μm, the internal resistance of the primary particles becomes high, and thus the discharge capacity at a high-speed charge and discharge rate becomes insufficient.

The shape of the electrode active material is not particularly limited, but it is easy to produce an electrode material made of spherical, particularly, truly spherical secondary particles, and thus the shape of the electrode active material is also preferably spherical, particularly, truly spherical.

The reason for the shape of the electrode active material to be preferably spherical is that, when paste for cathodes is prepared by mixing the electrode active material, a binder resin (coupling agent), and a solvent together, it is possible to reduce the amount of the solvent, and it also becomes easy to apply the paste for cathodes to a collector.

In addition, when the shape of the electrode active material is spherical, the surface area of the electrode active material is minimized, it is possible to set the blending amount of a binder resin (coupling agent) added to an electrode material mixture to the minimum amount, and it is possible to decrease the internal resistance of the obtained cathode, which is preferable.

Furthermore, since it is easy to closely pack the electrode active material, the amount of a cathode material loaded per unit volume increases, thus, it is possible to increase the electrode density, and consequently, it is possible to increase the capacity of the lithium ion battery, which is preferable.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols, and the like.

Regarding the blending ratio between the electrode active material and the organic compound, when the total amount of the organic compound is converted to the amount of carbon, the amount of carbon is preferably in a range of 0.3 parts by mass to 8.0 parts by mass, and more preferably in a range of 0.5 parts by mass to 5.0 parts by mass with respect to 100 parts by mass of the electrode active material.

The reason for setting the blending ratio between the electrode active material and the organic compound in the above-described range is that, when the blending ratio in terms of the amount of carbon in the organic compound is less than 0.3 parts by mass, the discharge capacity becomes low at a high-speed charge and discharge rate in a case in which the battery has been formed, and it becomes difficult to realize sufficient charge and discharge rate performance. On the other hand, when the blending ratio in terms of the amount of carbon in the organic compound exceeds 8.0 parts by mass, the film thickness of the carbonaceous film increases, and thus, during the diffusion of lithium ions in the carbonaceous film, the diffusion rate of the lithium ions is slow, the migration distance in the carbonaceous film becomes long, and thus the voltage drop at a high-speed charge and discharge rate needs to be addressed.

Examples of the pore-forming agent include lithium phosphate, depolymerizable resins such as polyacrylic acids, polyacetal, polyester, and polycaproamide, high-boiling point solvents such as triethylene glycol butyl methyl ether and diethylene glycol butyl methyl ether, and the like.

The electrode active material, the organic compound, and the pore-forming agent are dissolved or dispersed in water, thereby preparing a homogeneous slurry. During the dissolution or dispersion, a dispersant may be added.

The method for dissolving or dispersing the electrode active material and the organic compound in water is not particularly limited as long as the electrode active material is dispersed, and the organic compound is dissolved and dispersed, and it is preferable to use, for example, a medium stirring-type dispersion apparatus that stirs medium particles at a high speed such as a planetary ball mill, an oscillation ball mill, a bead mill, a paint shaker, or an attritor.

During the dissolution and dispersion, it is preferable to disperse the electrode active material in a primary particle form, and then add and stir the organic substance and the pore-forming agent so as to be dissolved or dispersed. Then, the surfaces of the primary particles of the electrode active material are covered with the organic compound and the pore-forming agent, and consequently, a coat obtained by mixing the organic compound and the pore-forming agent is uniformly interposed between the primary particles of the electrode active material.

In the preparation of the slurry, when the dispersion conditions of the slurry, for example, the concentrations of the electrode active material and the organic compound in the slurry, the stirring time, and the like are appropriately adjusted so that the ratio (D90/D10) of the electrode active material or the precursor thereof falls in a range of 5 to 30, it is possible to obtain a volume density of the obtained agglomerate in a range of 50% by volume to 80% by volume of the volume density of the solid agglomerate.

Therefore, it is possible to increase the concentration of the gasified substance of an aromatic carbon compound inside the agglomerate, and consequently, it becomes possible to support an almost even carbonaceous film on the surface of the electrode active material in the agglomerate.

Next, the slurry is sprayed and dried in a high-temperature atmosphere, for example, in the atmosphere at 70° C. to 250° C.

Next, the dried substance is fired in a non-oxidative atmosphere at a temperature in a range of 500° C. to 1000° C., and preferably in a range of 600° C. to 900° C. for 0.1 hours to 40 hours.

The non-oxidative atmosphere is preferably an inert atmosphere of nitrogen ($N_2$), argon (Ar), or the like, and in a case in which it is necessary to further suppress oxidization, a reducing atmosphere including approximately several % by volume of a reducing gas such as hydrogen ($H_2$) is preferred. In addition, for the purpose of removing organic components evaporated in the non-oxidative atmosphere during firing, a susceptible or burnable gas such as oxygen ($O_2$) may be introduced into an inert atmosphere.

The reason for setting the firing temperature in a range of 500° C. to 1000° C. is that, when the firing temperature is lower than 500° C., the organic compound included in the dried substance is not sufficiently decomposed and reacted, and thus the organic compound is not sufficiently carbonized, and consequently, a decomposed substance of the organic compound having a high resistance is generated in the obtained agglomerate, which is not preferable. On the other hand, when the firing temperature exceeds 1000° C., not only is Li in the electrode active material evaporated, creating the alteration of the composition of the electrode active material, but the grain growth of the electrode active material is also accelerated, and consequently, the discharge capacity at a high-speed charge and discharge rate becomes low, and it becomes difficult to realize sufficient charge and discharge rate performance, which is not preferable.

In the firing step, it is possible to control the particle size distribution of the obtained agglomerate by appropriately adjusting the firing conditions of the dried substance, for example, the rate of temperature rise, the maximum holding temperature, and the holding time.

When the pore-forming agent is removed from the carbonaceous film in the firing step, pores are formed in the carbonaceous film, and thus it is possible to adjust the density of the carbonaceous film.

Through the above-described steps, the surfaces of the primary particles of the electrode active material are coated with a carbonaceous film which was generated by thermal decomposition of an organic compound of a dried substance and has a density that has been optimally adjusted by the loss of the pore-forming agent, and thus an agglomerate made of secondary particles in which carbon is interposed between the primary particles of the electrode active material is obtained.

This agglomerate becomes the carbon-coated active material composite (electrode material) in the present embodiment.

According to the method for manufacturing the carbon-coated active material composite, it is possible to easily realize a lower cost carbon-coated active material composite which has a low environmental load and little apparatus damage, and is excellent in terms of electron conductivity and ion conductivity.

Electrode

An electrode of the present embodiment is an electrode which includes the carbon-coated active material composite of the present embodiment.

To produce the electrode of the present embodiment, the electrode material, a coupling agent made of a binder resin, and a solvent are mixed together, thereby preparing paint for electrode formation or paste for electrode formation. At this time, a conductive auxiliary agent such as carbon black may be added if necessary.

As the coupling agent, that is, the binder resin, for example, a polytetrafluoroethylene (PTFE) resin, a polyvinylidene fluoride (PVdF) resin, fluorine rubber, or the like is preferably used.

The blending ratio of the binder resin to the electrode material is not particularly limited, and, for example, the amount of the binder resin blended is set in a range of 1 part by mass to 30 parts by mass, and is preferably in a range of 3 parts by mass to 20 parts by mass with respect to 100 parts by mass of the electrode material.

The solvent used for the paint for electrode formation or the paste for electrode formation may be appropriately selected in accordance with the properties of the binder resin, and examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetamide, and N-methyl pyrrolidone, glycols such as ethylene glycol, diethylene glycol, and propylene glycol, and the like.

The solvent may be singly used, or a mixture of two or more solvents may be used.

Next, the paint for electrode formation or the paste for electrode formation is applied to one surface of a metal foil, and then is dried, thereby obtaining a metal foil having a coated film made of a mixture of the electrode material and the binder resin formed on one surface.

Next, the coated film is bonded by pressing, and is dried, thereby producing a collector (electrode) having an electrode material layer on one surface of the metal foil.

Through the above-described steps, the electrode of the present embodiment can be produced.

According to the electrode of the present embodiment, it is possible to improve the electron conductivity without impairing the lithium ion conductivity of the present embodiment.

Lithium Ion Battery

A lithium ion battery of the present embodiment includes a cathode made of the electrode of the present embodiment, a anode made of Li metal, a Li alloy, $Li_4Ti_5O_{12}$, a carbon material, or the like, an electrolytic solution, and a separator or a solid electrolyte.

In the lithium ion battery, it is possible to decrease the internal resistance of the collector (electrode) by producing the collector (electrode) using the carbon-coated active material composite of the present embodiment. Therefore, it is possible to suppress the internal resistance of the battery at a low level, and consequently, it is possible to provide a lithium ion battery capable of carrying out high-speed charge and discharge with no concern of the significant drop of the voltage.

As described above, according to the carbon-coated active material composite of the present embodiment, when the particles of an electrode active material having a carbonaceous film formed on the surface of the electrode active material, in which the charge migration of lithium ions occurs at the interface between the carbonaceous film and the electrode active material, and the value of the carbon supported amount with respect to the specific surface area of the particles of the electrode active material ([carbon supported amount]/[specific surface area of the particles of the electrode active material]) is set in a range of 0.01 to 0.5, are used, it is possible to set the activation energy of the insertion and removal reaction of lithium ions occurring in the carbon-coated active material composite in a range of 45 kJ/mol to 85 kJ/mol, to hold the insertion and removal, and electron conductivity of lithium ions on the surface of the electrode active material under the optimal conditions, and furthermore, to increase the output of the lithium ion battery.

According to the carbon-coated active material composite of the present embodiment, when the particles of an electrode active material having a carbonaceous film formed on the surface of the electrode active material, in which the charge migration of lithium ions occurs at the interface between the carbonaceous film and the electrode active material, and the value of the carbon supported amount with respect to the specific surface area of the particles of the electrode active material ([carbon supported amount]/[specific surface area of the particles of the electrode active material]) is set in a range of 0.01 to 0.5, are used, it is possible to make the increase in the activation energy of the insertion and removal reaction of lithium ions occurring at the interface between the carbonaceous coat and the electrode active material remain in a range of 5 kJ/mol to 40 kJ/mol compared with the activation energy of the insertion and removal reaction of lithium ions occurring at the interface between the electrode active material that is yet to be coated with carbon and the electrolytic solution, to hold the insertion and removal, and electron conductivity of lithium ions on the surface of the electrode active material under the optimal conditions, and furthermore, to increase the output of the lithium ion battery.

According to the method for manufacturing the carbon-coated active material composite of the present embodiment, since the electrode active material or the precursor thereof, the organic compound, and the pore-forming agent are mixed together, and then are thermally treated in a non-oxidative atmosphere, it is possible to easily manufacture a lower cost carbon-coated active material composite which has a low environmental load and little apparatus damage, and is excellent in terms of electron conductivity and lithium ion conductivity at a low cost.

According to the electrode of the present embodiment, since the carbon-coated active material composite of the present embodiment is included, it is possible to improve electron conductivity without impairing lithium ion conductivity. Therefore, it is possible to increase the output of the lithium ion battery.

According to the lithium ion battery of the present embodiment, since the cathode made using the electrode of the present embodiment is included, it is possible to improve electron conductivity without impairing lithium ion conductivity. Therefore, it is possible to provide a high-output lithium ion battery.

EXAMPLES

Hereinafter, the present invention will be specifically described using Examples 1 to 9 and Comparative Examples 1 to 4, but the present invention is not limited to these examples.

Example 1

Production of a Carbon-Coated Active Material Composite (Electrode Material)

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture.

Next, the mixture was accommodated in a pressure-resistant airtight container having a capacity of 8 L, and was hydrothermally synthesized for 1 hour at 200° C.

Next, the obtained sediment was washed using water, thereby obtaining cake-form precursor particles of an electrode active material.

Next, 150 g of the precursor of the electrode active material (in terms of the solid content), a polyvinyl alcohol aqueous solution obtained by dissolving 7.0 g of polyvinyl alcohol (PVA) as an organic compound in 100 g of water, 0.001 mol of phosphoric acid ($H_3PO_4$) and 0.001 mol of lithium acetate ($LiCH_3COO$) as pore-forming agents were mixed so as to produce a slurry, and a dispersion treatment was carried out on the slurry using a binary fluid-type wet jet crusher so that D50 reached 38 nm in the particle size distribution of the precursor particles of the electrode active material in the slurry.

Next, the slurry on which the dispersion treatment had been carried out was sprayed and dried in the atmosphere at 180° C., and the obtained dried substance was fired at 700°

C. in a nitrogen atmosphere for 1 hour, thereby obtaining a carbon-coated active material composite (electrode material) of Example 1 which was formed by agglomerating secondary carbonaceous coated electrode active material particles and had an average particle diameter of 6 μm and a specific surface area of 22.0 m²/g.

Assessment of the carbon-coated active material composite

The carbon supported amount of the electrode active material constituting the carbon-coated active material composite, the coating ratio of the carbonaceous film, the specific surface area of the electrode active material, and the film thickness of the carbonaceous film were respectively assessed.

(1) Carbon Supported Amount

The carbon supported amount of the electrode active material was measured using a carbon analyzer.

(2) Coating Ratio of the Carbonaceous Film

The carbonaceous film of an agglomerate constituting the electrode active material was observed using a transmission electron microscope (TEM) or an energy-dispersive X-ray spectroscope (EDX), and the proportion of portions covered with the carbonaceous film in the surface of the agglomerate was computed, thereby obtaining the coating ratio.

(3) Specific Surface Area

The specific surface area of the electrode active material was measured using a
Surface Area Analyzer.

(4) Film Thickness of the Carbonaceous Film

The film thickness of the carbonaceous film was measured using a transmission electron microscope (TEM).

The assessment results are described in Table 1.

Production of a Lithium Ion Battery

The electrode material, acetylene black (AB) as a conductive auxiliary agent, and polyvinylidene fluoride (PVdF) as a coupling material (binder) were mixed so that the mass ratio (electrode material:AB:PVdF) reached 90:5:5, and furthermore, N-methyl-2-pyrrolidone (NMP) was added as a solvent so as to impart fluidity, thereby producing a slurry.

Next, the slurry was applied onto a 15 μm-thick aluminum (Al) foil, and was dried. After that, the slurry was pressurized at a pressure of 600 kgf/cm², thereby producing a cathode of a lithium ion battery of Example 1.

Lithium metal was disposed as an anode for the pair of the above-mentioned cathode in the lithium ion battery, and a separator made of porous polypropylene was disposed between the cathode and the anode, thereby producing a battery member.

Meanwhile, ethylene carbonate and diethyl carbonate were mixed together in (a mass ratio of) 1:1, and furthermore 1 M of a $LiPF_6$ solution was added, thereby producing an electrolyte solution having lithium ion conductivity.

Next, the battery member was immersed in the electrolyte solution, thereby producing the lithium ion battery of Example 1.

Assessment of the Lithium Ion Battery

The internal resistance of the lithium ion battery was assessed.

The assessment method is as described below.

A cathode having an electrode area of 2 square centimeters and an electrode density of 2.0 g/cc and a anode made of lithium metal were placed opposite to each other through a 25 micrometer-thick separator made of polypropylene, and were disposed in a coin cell container having a diameter of 2 cm and a thickness of 3.2 mm, and the charge and discharge capacities at 1 C and 3 C were computed.

The charge and discharge capacities are described in Table 1.

Assessment of the Increase in the Amount of the Activation Energy

Electrochemical cells were produced by immersing the above-described electrode and lithium metal as a reference and counter electrode, and the impedance was measured.

The impedance was measured at a frequency in a range of 1 MHz to 0.1 mHz, and a semi-circular arc appearing at a frequency of 100 Hz or less was considered as the resistance of lithium ions occurring at the interface between the carbonaceous film and the electrode active material. The impedance was measured at 30° C., 35° C., 40° C., 45° C., 50° C., and 55° C., the temperature dependency of the resistance of lithium ion occurring at the interface between the carbonaceous film and the electrode active material was obtained, and the activation energy was computed from the temperature dependency.

The activation energy is described in Table 1.

Example 2

A carbon-coated active material composite and a lithium ion battery of Example 2 were produced in the same manner as in Example 1 except for the fact that 0.005 mol of phosphoric acid ($H_3PO_4$) and 0.005 mol of lithium acetate ($LiCH_3COO$) were used as the pore-forming agents, and were assessed.

The assessment results are described in Table 1.

Example 3

A carbon-coated active material composite and a lithium ion battery of Example 3 were produced in the same manner as in Example 1 except for the fact that 0.0005 mol of phosphoric acid ($H_3PO_4$) and 0.0005 mol of lithium acetate ($LiCH_3COO$) were used as the pore-forming agents, and were assessed.

The assessment results are described in Table 1.

Example 4

A carbon-coated active material composite and a lithium ion battery of Example 4 were produced in the same manner as in Example 2 except for the fact that, in the production of the carbon-coated active material composite, manganese (II) sulfate ($MnSO_4$) was used instead of iron (II) sulfate ($FeSO_4$), and were assessed.

The assessment results are described in Table 1.

Example 5

A carbon-coated active material composite and a lithium ion battery of Example 5 were produced in the same manner as in Example 1 except for the fact that, in the production of the carbon-coated active material composite, manganese (II) sulfate ($MnSO_4$) was used instead of iron (II) sulfate ($FeSO_4$), and 0.005 mol of phosphoric acid ($H_3PO_4$) and 0.005 mol of lithium acetate ($LiCH_3COO$) were used as the pore-forming agents, and were assessed.

The assessment results are described in Table 1.

Example 6

A carbon-coated active material composite and a lithium ion battery of Example 6 were produced in the same manner as in Example 1 except for the fact that, in the production of the carbon-coated active material composite, manganese (II) sulfate (MnSO$_4$) was used instead of iron (II) sulfate (FeSO$_4$), and 0.0005 mol of phosphoric acid (H$_3$PO$_4$) and 0.0005 mol of lithium acetate (LiCH$_3$COO) were used as the pore-forming agents, and were assessed.

The assessment results are described in Table 1.

Example 7

A carbon-coated active material composite and a lithium ion battery of Example 7 were produced in the same manner as in Example 1 except for the fact that 1.0 g of polyacrylic acid was added as the pore-forming agent, and were assessed.

The assessment results are described in Table 1.

Example 8

A carbon-coated active material composite and a lithium ion battery of Example 8 were produced in the same manner as in Example 1 except for the fact that 1.0 g of triethylene glycol butyl methyl ether was added as the pore-forming agent, and were assessed.

The assessment results are described in Table 1.

Example 9

A carbon-coated active material composite and a lithium ion battery of Example 9 were produced in the same manner as in Example 1 except for the fact that, in the production of the carbon-coated active material composite, the organic compound and the pore-forming agent were not added, and the fired electrode active material was coated with carbon using a carbon deposition apparatus and ethylene gas as a raw material, and were assessed.

The assessment results are described in Table 1.

Comparative Example 1

A carbon-coated active material composite and a lithium ion battery of Comparative Example 1 were produced in the same manner as in Example 1 except for the fact that 0.01 mol of phosphoric acid (H$_3$PO$_4$) and 0.01 mol of lithium acetate (LiCH$_3$COO) were used as the pore-forming agents, and were assessed.

The assessment results are described in Table 1.

Comparative Example 2

A carbon-coated active material composite and a lithium ion battery of Comparative Example 2 were produced in the same manner as in Example 1 except for the fact that 0.0001 mol of phosphoric acid (H$_3$PO$_4$) and 0.0001 mol of lithium acetate (LiCH$_3$COO) were used as the pore-forming agents, and were assessed.

The assessment results are described in Table 1.

Comparative Example 3

A carbon-coated active material composite and a lithium ion battery of Comparative Example 3 were produced in the same manner as in Example 1 except for the fact that sucrose was used as the organic compound, the pore-forming agent was not added, and the firing temperature was set to 800° C., and were assessed.

The assessment results are described in Table 1.

Comparative Example 4

A carbon-coated active material composite and a lithium ion battery of Comparative Example 4 were produced in the same manner as in Example 1 except for the fact that, in the production of the carbon-coated active material composite, the organic compound and the pore-forming agent were not added, and the fired electrode active material was coated with carbon using a carbon deposition apparatus and ethylene gas as a raw material, and were assessed.

The assessment results are described in Table 1.

TABLE 1

| | [carbon supported amount]/[specific surface area of the particles of the electrode active material] | Coating ratio of carbonaceous film (%) | Density of carbonaceous film (g/cm$^3$) | Film thickness of carbonaceous film (nm) | Activation energy without carbon film (KJ/mol) | Activation energy after formation of carbon film (KJ/mol) | Increased activation energy (KJ/mol) | Charge/discharge capacity 1C (mAh/g) | Charge/discharge capacity 3C (mAh/g) |
|---|---|---|---|---|---|---|---|---|---|
| Example 1 | 0.05 | 86 | 0.3 | 3.2 | 41 | 58 | 17 | 151 | 135 |
| Example 2 | 0.02 | 78 | 0.12 | 9.6 | 41 | 49 | 8 | 151 | 122 |
| Example 3 | 0.3 | 94 | 0.86 | 2.4 | 41 | 63 | 22 | 148 | 132 |
| Example 4 | 0.11 | 81 | 0.31 | 1.1 | 45 | 66 | 21 | 150 | 131 |
| Example 5 | 0.08 | 72 | 0.12 | 1.2 | 45 | 60 | 15 | 154 | 121 |
| Example 6 | 0.42 | 88 | 1.4 | 1.3 | 45 | 83 | 38 | 147 | 132 |
| Example 7 | 0.06 | 88 | 0.31 | 3.3 | 41 | 59 | 18 | 148 | 133 |
| Example 8 | 0.06 | 84 | 0.27 | 2.9 | 41 | 55 | 14 | 152 | 134 |
| Example 9 | 0.06 | 91 | 0.31 | 2.4 | 41 | 48 | 7 | 150 | 122 |
| Comparative Example 1 | 0.006 | 63 | 0.02 | 1.7 | 41 | 44 | 3 | 104 | 87 |
| Comparative Example 2 | 1.31 | 96 | 1.31 | 1.1 | 41 | 86 | 45 | 138 | 62 |
| Comparative Example 3 | 0.87 | 83 | 0.87 | 13.2 | 41 | 60 | 19 | 132 | 83 |
| Comparative Example 4 | 0.06 | 91 | 0.31 | 2.5 | 41 | 43 | 2 | 133 | 74 |

According to the above-described results, in the lithium ion batteries in which the carbon-coated active material composites of Examples 1 to 9 were used, favorable load characteristics were exhibited with no impairment of the lithium ion conductivity.

On the other hand, in the lithium ion batteries in which the carbon-coated active material composites of Comparative Examples 1 to 4 were used, the lithium ion conductivity was impaired, and the load characteristics were degraded.

As described above, it was confirmed that, when the carbon-coated active material composite in which the activation energy of the insertion and removal reaction of lithium ions occurring at the interface between the carbon-coated active material composite and the electrolytic solution is in a range of 45 kJ/mol to 85 kJ/mol, and the value of the carbon supported amount with respect to the specific surface area of the particles of the electrode active material ([carbon supported amount]/[specific surface area of the particles of the electrode active material]) is set in a range of 0.01 to 0.5 is used, a lithium ion battery exhibiting favorable load characteristics can be obtained with no impairment of the lithium ion conductivity.

In addition, it was confirmed that, when the carbon-coated active material composite in which the increase in the amount of the activation energy of the insertion and removal reaction of lithium ions occurring at the interface between the carbonaceous film and the electrode active material is in a range of 5 kJ/mol to 40 kJ/mol with respect to the activation energy of the insertion and removal reaction of lithium ions occurring at the interface between the electrode active material that is yet to be coated with carbon and the electrolytic solution, and the value of the carbon supported amount with respect to the specific surface area of the particles of the electrode active material ([carbon supported amount]/[specific surface area of the particles of the electrode active material]) is set in a range of 0.01 to 0.5 is used, a lithium ion battery exhibiting favorable load characteristics can be obtained with no impairment of the lithium ion conductivity.

INDUSTRIAL APPLICABILITY

Since the carbon-coated active material composite of the present invention is a carbon-coated active material composite in which the charge migration of lithium ions occurs at the interface between the carbonaceous film and the electrode active material, the activation energy of the insertion and removal reaction of lithium ions occurring at the interface between the carbon-coated active material composite and the electrolytic solution is in a range of 45 kJ/mol to 85 kJ/mol, and the value of the carbon supported amount with respect to the specific surface area of the particles of the electrode active material ([carbon supported amount]/[specific surface area of the particles of the electrode active material]) is set in a range of 0.01 to 0.5, it is possible to provide an electrode active material coated with the carbonaceous film which has electron conductivity and lithium ion conductivity satisfying high-speed charge and discharge characteristics, and thus the carbon-coated active material composite is applicable to next-generation secondary batteries anticipated to have higher voltage, higher energy density, higher load characteristics, and more favorable high-speed charge and discharge characteristics, and in the case of the next-generation secondary batteries, the effects are extremely great.

Since the carbon-coated active material composite of the present invention is a carbon-coated active material composite, in which the increase in the activation energy of the insertion and removal reaction of lithium ions occurring at the interface between the carbonaceous coat and the electrode active material remains in a range of 5 kJ/mol to 40 kJ/mol compared with the activation energy of the insertion and removal reaction of lithium ions occurring at the interface between the electrode active material that is yet to be coated with carbon and the electrolytic solution, and the value of the carbon supported amount with respect to the specific surface area of the particles of the electrode active material ([carbon supported amount]/[specific surface area of the particles of the electrode active material]) is in a range of 0.01 to 0.5, it is possible to provide an electrode active material coated with the carbonaceous film which has electron conductivity and lithium ion conductivity satisfying high-speed charge and discharge characteristics, and thus the carbon-coated active material composite is applicable to next-generation secondary batteries anticipated to have higher voltage, higher energy density, higher load characteristics, and more favorable high-speed charge and discharge characteristics, and in the case of the next-generation secondary batteries, the effects are extremely great.

We claim:

1. A carbon-coated active material composite, comprising a particle in which a carbonaceous film is formed on an electrode active material and charge migration of lithium ions occurs at an interface between the carbonaceous film and the electrode active material,
   wherein an activation energy of an insertion and removal reaction of lithium ions occurring at an interface between the carbon-coated active material composite and an electrolytic solution is in a range of 45 kJ/mol to 85 kJ/mol, a value of a carbon supported amount with respect to a specific surface area of particles of an electrode active material, calculated as [carbon supported amount]/[specific surface area of the particles of the electrode active material], is in a range of 0.01 to 0.5, and the activation energy is a value measured using an electrolyte solution obtained by mixing ethylene carbonate and diethyl carbonate at a 1:1 ratio.

2. A carbon-coated active material composite, comprising a particle in which a carbonaceous film is formed on an electrode active material and charge migration of lithium ions occurs at an interface between the carbonaceous film and the electrode active material,
   wherein an activation energy of an insertion and removal reaction of lithium ions occurring at an interface between the carbon-coated active material composite and an electrolytic solution increases by a range of 5 kJ/mol to 40 kJ/mol compared with the activation energy of the insertion and removal reaction of lithium ions occurring at an interface between the electrode active material that is yet to be coated with carbon and the electrolytic solution, and a value of a carbon supported amount with respect to a specific surface area of particles of the electrode active material, calculated as [carbon supported amount]/[specific surface area of the particles of the electrode active material], is in a range of 0.01 to 0.5, and the activation energy is a value measured using an electrolyte solution obtained by mixing ethylene carbonate and diethyl carbonate at a 1:1 ratio.

3. The carbon-coated active material composite according to claim 1,
   wherein the carbonaceous film has a net-shaped structure, coats 70% or more of surfaces of the particles of the electrode active material, and a density of the carbonaceous film is in a range of 0.1 g/cm$^3$ to 1.5 g/cm$^3$.

4. The carbon-coated active material composite according to claim 1,
wherein a film thickness of the carbonaceous film is in a range of 0.1 nm to 10 nm.

5. A lithium ion battery comprising:
a cathode which comprises the carbon-coated active material composite according to claim 1.

6. The carbon-coated active material composite according to claim 2,
wherein the carbonaceous film has a net-shaped structure, coats 70% or more of surfaces of the particles of the electrode active material, and a density of the carbonaceous film is in a range of 0.1 g/cm$^3$ to 1.5 g/cm$^3$.

7. The carbon-coated active material composite according to claim 2, wherein a film thickness of the carbonaceous film is in a range of 0.1 nm to 10 nm.

8. A lithium ion battery, comprising a cathode which comprises the carbon-coated active material composite according to claim 2.

* * * * *